Figure 1:
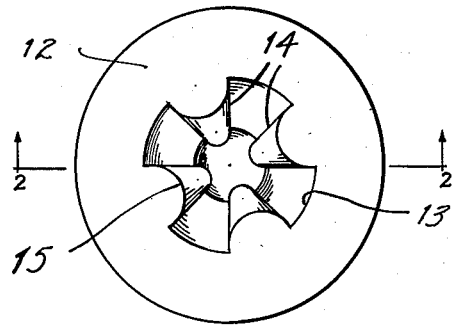

June 18, 1946.  H. F. PHILLIPS  2,402,342
SCREW
Original Filed Jan. 19, 1943

HENRY F. PHILLIPS
INVENTOR.

BY *E. G. Buchanan*

ATTORNEY

Patented June 18, 1946

2,402,342

UNITED STATES PATENT OFFICE 2,402,342

SCREW

Henry F. Phillips, Portland, Oreg., assignor to Phillips Screw Company, Portland, Oreg.

Continuation of application Serial No. 472,823, January 19, 1943. This application August 4, 1944, Serial No. 548,045

11 Claims. (Cl. 85—45)

1

This invention relates to improvements in screws, bolts and the like fastening devices and more particularly to tool receiving recesses formed in the heads thereof.

This application is a continuation of my prior application, Serial No. 472,823, filed January 19, 1943.

It is a general object of the invention to provide a new and improved tool receiving recess in the head of a fastening device of the type referred to whereby the fastening device will be held firmly in place upon the end of a cooperatively shaped driving tool, due to frictional engagement between the side walls of the recess and the tool end, for facilitating the driving of the device in the desired location.

A further object of the invention is to provide a new and improved tool receiving recess particularly suitable for use in the heads of screws, bolts and the like fastening devices which recesses are readily capable of manufacture by automatic machinery with a high degree of accuracy and uniformity.

Another object of the invention is to provide a new and improved tool receiving recess for use in the heads of screws, bolts and the like fastening devices the recess being particularly adapted for permitting an improved wedging relation with the driver bit irrespective of minor variations in the manufacture of either the recess or the driver bit.

A still further object is the provision of a recess which may readily be punched by a bit in an automatic machine, the recess being of such a shape as not to cause undue wear or breakage of the bit.

In accordance with the illustrated embodiment of the invention a screw head is provided with a recess comprising a plurality of alternate ribs and flutes, the recess being of a generally frustoconical shape, the bottom of the various flutes lying in the frusto-conical surface. The ribs extend longitudinally of the recess, the width of the base of the ribs being substantially the same as the width of the flute bottoms at any corresponding depth of the recess. The ribs are furthermore rounded with a radius of curvature such that the axis thereof lies substantially wholly within the frusto-conical surface. The facing side walls of the adjacent ribs provide surfaces contiguous with the bottoms of the flutes substantially at right angles with respect to the conical surface defining a wedge shaped slot adapted to receive a cooperatively shaped rib of a driver tool and to

2 engage frictionally therewith in such manner that the screw is held firmly in position.

For a consideration of what is believed novel and inventive the attention is directed to the following description taken in connection with the accompanying drawing while the features of novelty will be pointed out with greater particularity in the appended claims.

Figure 3:
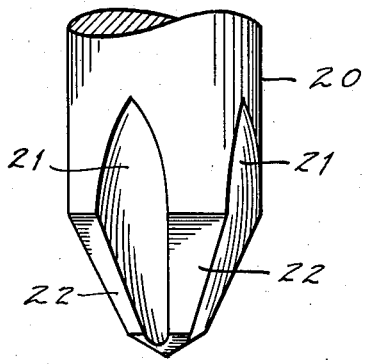
Figure 2:
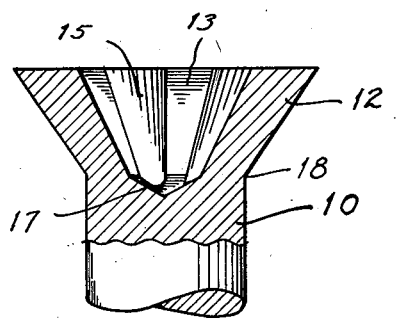
Figure 4:
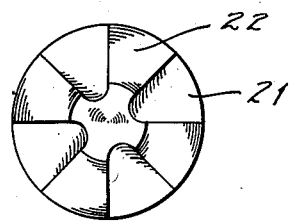
Figure 6:
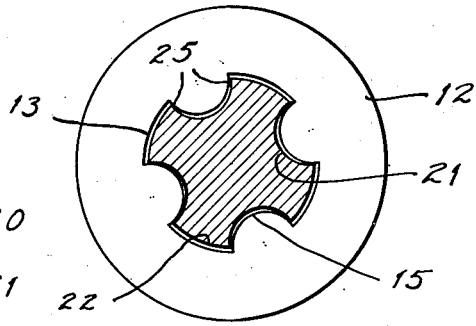
Figure 5:
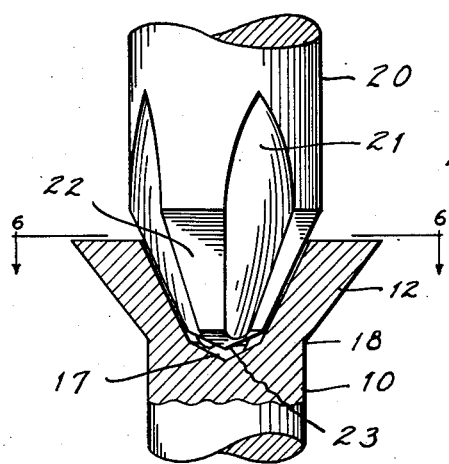

In the drawing:

Fig. 1 is a plan view of a screw head having a recess formed therein in accordance with one form of the invention; Fig. 2 is a side elevation partially in section of a screw head and taken along the line 2—2 of Fig. 1; Fig. 3 is a fragmentary side elevation either of a punch for forming a recess as illustrated in Figs. 1 and 2 or of a driver bit for use therewith; Fig. 4 is an end view of Fig. 3; Fig. 5 is a view illustrating a driver bit inserted into a recess; and Fig. 6 is a view taken along the line 6—6 of Fig. 5.

Referring to the drawing, 10 indicates the shank of a screw having head 12 formed thereon and provided with a recess therein in accordance with one form of the present invention. In the illustrated embodiment a flat headed wood screw is shown though it will be understood that the invention is not to be necessarily so limited in that it is applicable generally to any type of head.

The recess comprises a plurality of alternate flutes and ribs, the flutes being defined in part by the bottom walls 13 all of which lie in a frustoconical surface. The flutes are further defined in part by the side walls 14 of the adjacent intervening ribs 15 which extend outwardly from the frusto-conical surface and longitudinally thereof from the top to the bottom of the recess. While not essentially so, the ribs 15 are preferably of a rounded shape tapering from the top to the bottom of the recess uniformly in accordance with the angle of taper of the conical surface. The width of the ribs 15 taken along the line of the frusto-conical surface at the top of the recess is substantially equal to the corresponding width of the flutes, so that the maximum width of the ribs is substantially equal to the maximum width of the flutes. As illustrated in the drawing, the bases of the ribs are substantially the same width as the bottom wall portions 13 of the flutes, that is, the flutes and the ribs have the same width along any peripheral arc concentric with the axis of the recess. While not necessarily so limited, the diameter of the curvature of the ribs 15 corresponds to the width of the base along such peripheral arc in which case the axis of the rib curvature lies wholly within the frusto-conical surface. Thus the convex surface of each of the ribs is also frusto-conical in shape, having side wall portions merging with the bottom walls 13 of the flutes at substantially right angles with respect thereto so that the facing walls of two adjacent ribs are substantially parallel at their point of juncture with the flute bottoms.

The bottom of the recess is defined by the concave bottom wall 17 which is preferably disposed slightly below the line 18 between the shank 10 and head 12 of the screw.

In Figs. 3 and 4 is illustrated the bit end of a tool for cooperatively fitting into the recess for use as a driver. As shown, the tool comprises a shank 20 having a tapered end and provided with milled flutes 21 therein defining a plurality of ribs 22 therebetween. The resultant ribs 22 are of a shape corresponding generally to the contour of the flutes of the recess within the screw head while the flutes 21 are rounded so as to fit cooperatively around the ribs 15. The driver or tool unit is separately described in greater detail and claimed in my co-pending application, Serial No. 472,822, filed January 19, 1943.

It will readily be apparent to those skilled in the art that the recess as described may readily be formed by means of a punch having a bit end shaped similarly to the end of the driver illustrated in Figs. 3 and 4. In this regard particular attention is directed to the relatively sharp corners along the opposite edges of the ribs 22 providing cutting edges which greatly facilitate the punching operation with less wear on the punch and resulting in a much longer life than in other types of punches.

In the normal screw driving operation the screw is first fitted onto the end of the driver as illustrated in Fig. 5. Due to the shape of the recess of this particular invention the screw will readily adhere to the bit of the driver even though the driver may be subsequently swung around through any angle or even lightly jarred. The tendency of the screw to cling firmly onto the end of the driver is due to the inherent shape of the cooperating ribs of the driver and flutes in the recess whereby a relatively large number of surfaces are brought into frictional engagement with each other. Referring to Fig. 3 it will be observed that the ribs 22 are of a wedge shape and as they are moved downwardly into the cooperatively wedge shaped grooves in the recess, they will wedge tightly between the opposite side walls 14 of the recess flute. In the case of a recess provided with four flutes, as illustrated, each of the four ribs of the driver will be frictionally engaged on both sides. In order to enhance such wedging action between the ribs of the driver and the flutes of the screw recess, the extreme end of the driver should be somewhat foreshortened, as indicated at 23, Fig. 5, in order that it will not abut against the bottom of the recess or at least not until the outer convex surface of the driver ribs 22 have all moved into flat engagement with the bottom walls 13 of the flutes.

By reference to Fig. 6 it will be observed that the opposite sides of the driver ribs engage frictionally with the side walls 14 of the flutes within the screw recess somewhat in advance of the movement of the driver tip into its limit position within the recess. Due to the fact that the side walls 14 of the ribs of the screw-recess which define the sides of the flutes therebetween are substantially parallel to each other, the edges of the driver ribs 22 will be frictionally engaged thereby as indicated at 25 considerably before the convex faces of the ribs 22 abut against the bottoms 13 of the recess flutes. It will be apparent that in placing the screw upon the end of the driver with a relatively slight force it will become firmly wedged thereupon to permit movement of the screw into position for driving into the workpiece. As the driving force is applied to the driver, then the driver tip will be forced further into the recess of the screw to the limit position in which the outer walls of the driver ribs are in full engagement with the bottoms of the recess flutes.

Having described the principle of the invention in what is considered to be a preferred embodiment, it is desired that it be understood that the specific details shown are merely illustrative and the invention may be carried out by other means.

I claim:

1. A screw having a tool receiving recess formed in its head, said recess being defined by alternate flutes and ribs, the bottom walls of said flutes lying in a frusto-conical surface, said ribs being convexly curved and joining said bottom walls at substantially right angles, each of said ribs having its axis of curvature extending wholly in said frusto-conical surface.

2. A screw having a tool receiving recess formed in its head, said recess being generally frusto-conical in shape and being defined by a plurality of alternate ribs and flutes, the bottom wall of said flutes lying in a conical surface, said ribs extending longitudinally of said recess and being convexly curved and joining the bottom surface of said flutes at substantially right angles, the width of said flutes and said ribs being substantially equal along any arc on said frusto-conical surface.

3. A screw having a tool receiving recess formed in its head, said recess being defined by a plurality of alternate ribs and flutes, the bottom walls of said flutes lying in a frusto-conical surface, said ribs extending longitudinally of said recess and being convexly curved throughout the full length thereof from the top to the bottom of said recess, the axes of curvature of said ribs lying wholly on sadi conical surface and the width of said ribs and said flutes being substantially the same along any circumferential arc of said recess concentric with said surface.

4. A screw having a tool receiving recess formed in its head, said recess being defined by alternate ribs and flutes, the bottom walls of said flutes lying in a frusto-conical surface, said ribs extending longitudinally of said recess and being convexly curved, the width of the base of said ribs being substantially the same as the width of the bottom of said flutes in any horizontal section of said recess, the radius of curvature of said ribs at any horizontal section corresponding to substantially one half the width of the rib base at that section.

5. A screw having a tool receiving recess formed in its head, said recess being defined by alternate flutes and ribs, the bottom walls of said flutes lying in a frusto-conical surface, the side walls of said ribs joining the bottom walls of said flutes substantially at right angles, the width of the base of said ribs along said conical surface being substantially the same as the width of said flute bottoms in any section of said recess at right angles to its axis.

6. A screw having a tool receiving recess formed in its head, said recess being defined by alternate flutes and ribs, the bottom walls of said flutes lying in a frusto-conical surface, the opposite side walls of said ribs extending substantially perpendicularly adjacent the bottom walls of said flutes, the width of said flutes and said ribs being substantially the same along said frusto-conical surface at the upper end of said recess.

7. A screw having a tool receiving recess formed in its head, said recess being defined in part by outer side wall portions arranged wholly in a common conical surface, said side wall portions being separated by a plurality of ribs extending inwardly of said recess and longitudinally thereof, said ribs being joined to said side wall portions substantially at right angles, said wall portions decreasing progressively in width from the top to the bottom of said recess, the width of said wall portions and said ribs being substantially the same at the top of said recess taken along the line of said conical surface.

8. A screw having a tool receiving recess formed in its head, said recess being generally frusto-conical in shape and having a plurality of longitudinal ribs outstanding from the wall thereof and defining a plurality of grooves therebetween, the surface of said ribs joining the bottom surface of said grooves at substantially right angles, said grooves and said ribs tapering uniformly from the top to the bottom of said recess, the width of said grooves being substantially the same as that of said ribs along any peripheral arc concentric with the axis of said recess.

9. A screw having a tool receiving recess formed in its head, said recess being generally frusto-conical in shape and being defined by alternate grooves and ribs, said ribs defining wedge shaped grooves having bottom walls of progressively decreasing width from the top to the bottom of said recess, said ribs joining said walls at substantially right angles, the width of said grooves at the top of the recess being substantially equal to the distance between the uppermost corners of adjacent grooves.

10. A screw having a tool receiving recess formed in its head, said recess being defined by alternate flutes and ribs, the bottom walls of said flutes lying in a frusto-conical surface, said ribs extending longitudinally of said recess, the width of the base of said ribs being substantially equal to the width of the bottom of said flutes in any horizontal section of said frusto-conical surface, the side walls of a pair of adjacent ribs facing each other adjacent the flute bottom wall therebetween to define a wedge shaped groove for frictionally engaging a correspondingly shaped tool rib, the side walls of said ribs joining said bottom walls at substantially right angles.

11. A screw having a recess formed in its head for cooperatively receiving a driving tool provided with a plurality of grooves and ridges, said recess being defined by a plurality of ribs and flutes, the bottom walls of said flutes lying in a frusto-conical surface, said ribs extending longitudinally of said recess, the width of said ribs along said frusto-conical surface being substantially the same as the width of said flute bottoms at corresponding points from the top to the bottom of said recess, the opposite side walls of said ribs next adjacent said flute bottoms extending outwardly substantially perpendicularly from said frusto-conical surface whereby wedge shaped grooves are defined thereby with said flute bottoms, said rib side walls being adapted to engage frictionally with ridges of a tool for holding said screw in place on said tool.

HENRY F. PHILLIPS.